US012617228B1

(12) United States Patent
Llacuna

(10) Patent No.: US 12,617,228 B1
(45) Date of Patent: May 5, 2026

(54) WALL MOUNTED LIGHT EMITTING PANEL AND A CEILING MOUNTED REFLECTIVE PANEL PROVIDING AN ENHANCED PERCEIVED VERTICAL SPACE

(71) Applicant: Alfonso Ragus Llacuna, Irvine, CA (US)

(72) Inventor: Alfonso Ragus Llacuna, Irvine, CA (US)

( * ) Notice: Subject to any disclaimer, the term of this patent is extended or adjusted under 35 U.S.C. 154(b) by 0 days.

(21) Appl. No.: 18/445,937

(22) Filed: Apr. 5, 2024

(51) Int. Cl.
*B44F 1/02* (2006.01)
*F21S 8/00* (2006.01)
*F21S 8/02* (2006.01)
*F21V 7/05* (2006.01)
*F21W 121/00* (2006.01)

(52) U.S. Cl.
CPC *B44F 1/02* (2013.01); *F21S 8/02* (2013.01); *F21S 8/03* (2013.01); *F21V 7/05* (2013.01); *F21W 2121/00* (2013.01)

(58) Field of Classification Search
CPC ... F21S 8/037; F21S 8/033; F21S 8/04; B44F 1/02
See application file for complete search history.

(56) References Cited

U.S. PATENT DOCUMENTS 7,358,929 B2 * 4/2008 Mueller ............... H05B 47/155 345/1.3
2017/0059151 A1 * 3/2017 Black .................. G02B 6/0055

FOREIGN PATENT DOCUMENTS

JP 2012048975 A * 3/2012 .............. F21S 8/037
KR 20180050119 A * 5/2018 ............ F21V 7/0016

* cited by examiner

*Primary Examiner* — Robert J May

(57) ABSTRACT

A mesmerizing way to create the illusion of enhanced perceived vertical space in a room. A wall-mounted light-emitting panel (1) is placed contiguously flush to a ceiling-mounted reflective panel (2) with a smooth surface, FIG. 1, whereby the light-emitting panel is reflected by the reflective panel, thereby producing the image of a larger object that appears to extend upwards past the ceiling. The image has a magnifying, mesmerizing and comforting effect besides affording savings in construction costs.

1 Claim, 3 Drawing Sheets
(1 of 3 Drawing Sheet(s) Filed in Color)

WALL MOUNTED LIGHT EMITTING PANEL AND A CEILING MOUNTED REFLECTIVE PANEL PROVIDING AN ENHANCED PERCEIVED VERTICAL SPACE

CROSS REFERENCE TO RELATED APPLICATION

None

FEDERALLY SPONSORED RESEARCH

None

SEQUENCE LISTING OR PROGRAM

Not applicable

BACKGROUND

Field of Endeavor

This application presents one way of solving a common problem in interior design: How to enhance perceived space in a room and make it economically, aesthetically interesting and psychologically comforting as well.

Background Art

In the past, the use of a decorative wall-mounted light box in a small room was commonplace. The box, with a back-lit translucent face, was used to "open up" the room by mimicking a closed translucent window, thereby suggesting lateral space outside the room. To maximize the effect, a substantial portion of the wall was covered by the light box.

SUMMARY OF THE EMBODIMENTS

This is a wall-mounted, light-emitting panel that is placed contiguously flush to a ceiling-mounted reflective panel with a smooth surface. The light-emitting panel, together with its adjacent reflected image on the reflective panel, appears as one larger object that extends upward beyond the ceiling, thus "opening up" the room vertically.

ADVANTAGES OF THE EMBODIMENTS

The embodiments in this application would enhance perceived vertical space in a room by producing the illusion that the larger object, comprised of the light-emitting panel and its reflection on the reflective panel, pierces the ceiling and soars upwards beyond it. In addition, the illusion would psychologically suggest the existence of an upper floor or an attic. Thus, vertical space expands perceptually and psychologically.

The embodiments provide a cost advantage as well. Ignoring the cost of the less expensive reflective panel, the cost of creating the larger object is cut by approximately half. That is, the size of the wall area needed, the cost of materials and labor as well as production time are cut in half. This is an important consideration, especially if: (1) space is scarce such as in a small room with a low ceiling and limited wall space; (2) expensive materials such as stained glass are used; and (3) costly production time required by artists and artisans is at a premium. In addition, the psychological suggestion of an upper floor could be had without cutting through the ceiling or building a whole new upper floor.

The embodiments also offer aesthetic advantages. While a light box, as in prior art, is commonplace, a fixture whose image appears whole, with only half of itself being physical, has a magnifying effect. It is also mesmerizing. So is an image that is part real and part illusion, with minimal distinction between the parts, thus eliciting a double take. So is a three-' dimensional fixture that is perceived as a two-dimensional image. So is a device that expands the perceived space vertically beyond the physical boundary of the ceiling, without breaking any material. So is an article of manufacture that psychologically suggests new space, like an upper floor, without having to manufacture it. So is an innovation that applies a simple law of physics to a fascinating work of art.

Thus, with these embodiments, there is an intriguing interplay between reality and illusion, between the whole and its parts, between space and its boundaries, between the two-dimensional and three-dimensional realms, between physical and mental processes, and between science and art. These novel features are especially appealing in artistic and design fields such as interior design, theatrical stage design, image manipulation (such as photoshop and artificial intelligence as applied to the visual arts) and architecture. They should also be of interest to perception psychologists, magicians, devotees of illusion artists such as MC Escher, and students of philosophers/scientists such as Nietzsche ("Truths are illusion"), Einstein (Reality is merely an illusion), and Plato ("Perception determines one's reality").

For obvious reasons, these embodiments should definitely appeal to builders, contractors, architects and realtors, to whom "spacious" is a magic word.

The perception of enhanced space provided by these embodiments may have beneficial psycho-social effects as well, such as: therapy for claustrophobia (fear of enclosed spaces). The embodiments may also interest architects in the subfield of molding living spaces to positively impact human behavior and psyche. Finally, the mesmerizing effect of the embodiments described above, compelling a double take, engages the room occupant in an interactive experience with the artful environment. This, according to recent research in neuroaesthetics, can benefit brain functioning and alleviate neurological illnesses such as Alzheimer's disease (Your Brain on Art, by Susan Magsamen and Ivy Ross, March 2023).

Finally, the embodiments may be considered examples of applied science. However, note that this utility patent application is not inventing a physical law of mirrors or reflection. Rather, it is an application of a law of physics to an article of manufacture.

The physical law of reflection by a mirror or any reflective material is, of course, obvious and legally considered a judicial exception. But the fact that these embodiments apply a law of nature does not necessarily make them obvious. What innovation that exists or is physically possible is not somehow based on some law of nature?

Besides, the embodiments do "recite additional elements that amount to significantly more than the judicial exception." Specifically, an article of manufacture that dramatically trans-forms a room and elicits a mesmerizing experience is not obvious. Nor is a device that appears to pierce the ceiling but really does not; that appears whole but is actually only half; that draws a double take to figure out which part is real and which part is not; that blurs the boundaries of space; that leads the eyes back and forth between the two-dimensional and the three-dimensional realms; and that psychologically suggests an extra space that does not exist physically. Nor is a way that artfully applies a simple law of physics; that may have psycho-social benefits; and that points to cost-cutting strategies for construction. Nor is an innovation that may draw critical interest among students and practitioners of such diverse fields as architecture, interior design, psychology (perception, spatial processing, therapy for claustrophobia, magic), medicine (neuroaesthetics), science (applied physics), philosophy (reality versus illusion) and real estate (construction and sales).

The veteran contractor who successfully built an easily replicable and photogenic prototype of one embodiment in the inventor's bathroom (see below) declared, "I have never seen anything like this before."

In summary, the embodiments would, in novel ways, transform a room into an intriguing and comforting space to be appreciated at multiple levels. All these at half the cost. One neighbor said it all, "I can live in this bathroom all day!"

DESCRIPTION OF THE DRAWINGS

The patent or application file contains at least one drawing executed in color. Copies of this patent or patent application publication with color drawing(s) will be provided by the Office upon request and payment of the necessary fee.

One embodiment is depicted in FIG. 1. It shows a perspective view of the embodiment seen on the floor of the room. A panel 1 with a light-emitting face 3 is mounted flush to the wall. It's straight upper edge is placed flush to a reflective panel 2 with a smooth surface, which is mounted flush to the ceiling. The reflective panel 2 has one straight edge placed flush to the wall. A variable pattern 4 may be applied to the face 3 of the light-emitting panel 1. The perspective view provided by FIG. 1 shows the bottom 6 of the light-emitting panel 1.

A viewer on the floor of the room, seeing the wall-mounted light-emitting panel 1 and its reflection 5 on the ceiling-mounted reflective panel 2 would see an enlarged (approximately double-sized) image of the light-emitting panel 1.

Figure 2:
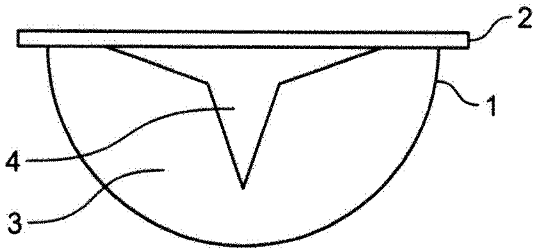
Figure 3:
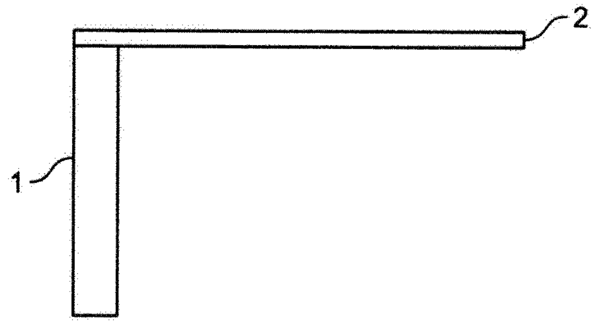
Figure 4:
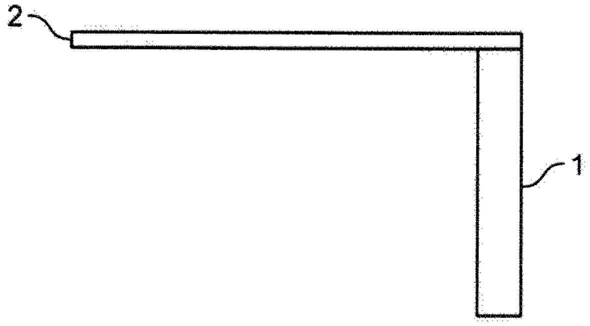

FIGS. 2, 3, and 4 present orthogonal views of one embodiment, respectively, the front of the embodiment, one side viewed from the left, and the other side viewed from the right.

Figure 5:
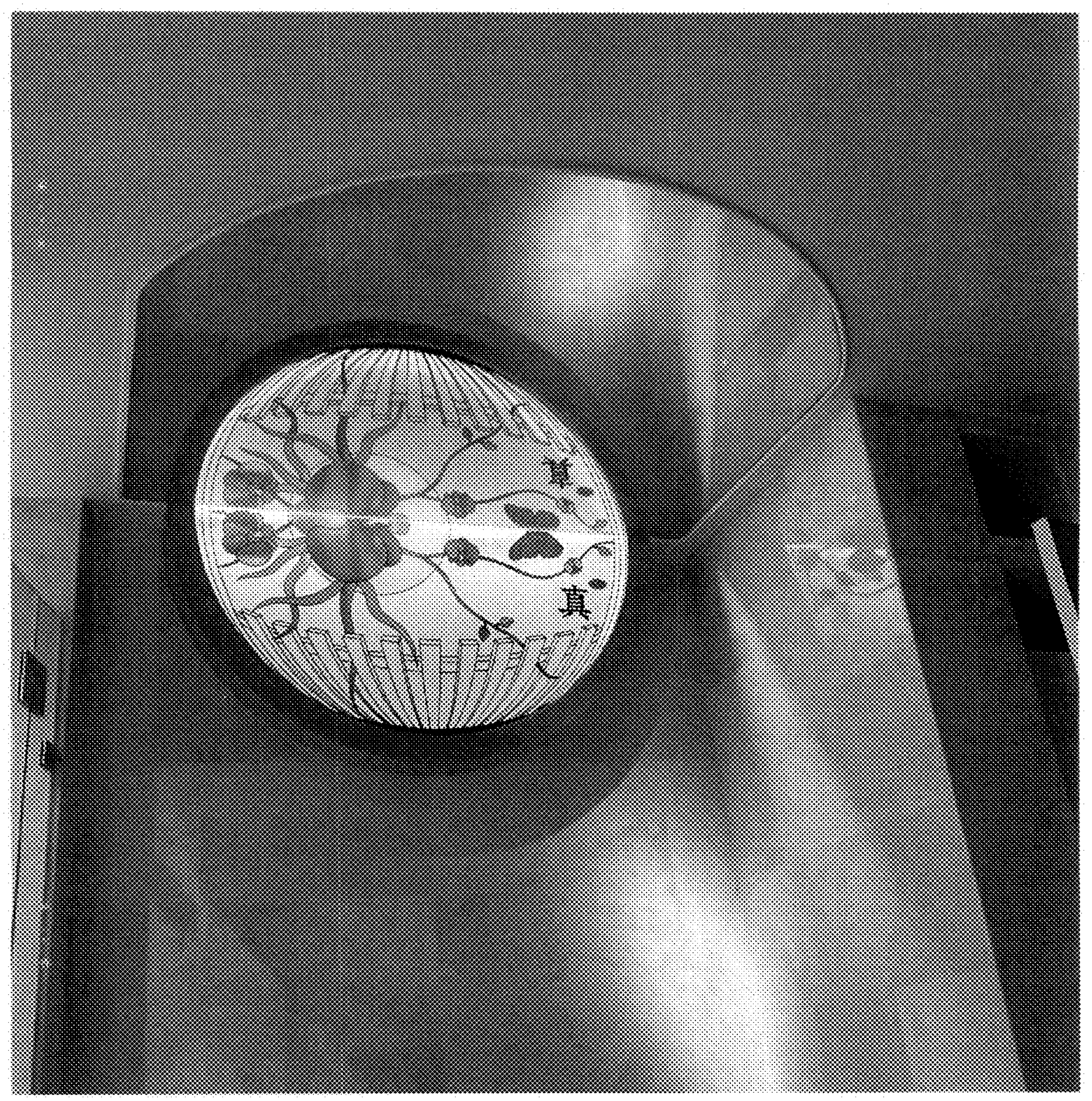

FIG. 5 is a color photograph of a prototype of one embodiment, done in stained glass, as seen from the floor of the inventor's bathroom. The photograph is submitted to highlight a major feature of the embodiment, that is, its mesmerizing effect, eliciting a double take, as described above. This would not be appreciated by the average consumer with a mere black and white line drawing.

ALTERNATIVE EMBODIMENTS AND RAMIFICATIONS

While the above description contains many specifications, it should not be construed as a limitation on the scope of the application. Many other ramifications and various embodiments are possible, with examples described below.

The size and shape of the light-emitting panel 1 may vary.

For an optimally pleasing proportion from the point of view of some consumers, it would be smaller substantially than the whole wall. Also, it would have one straight edge that is placed flush to the reflective panel 2 on the ceiling. The rest of its border may be linear, curvilinear or a mixture of both.

Figure 1:
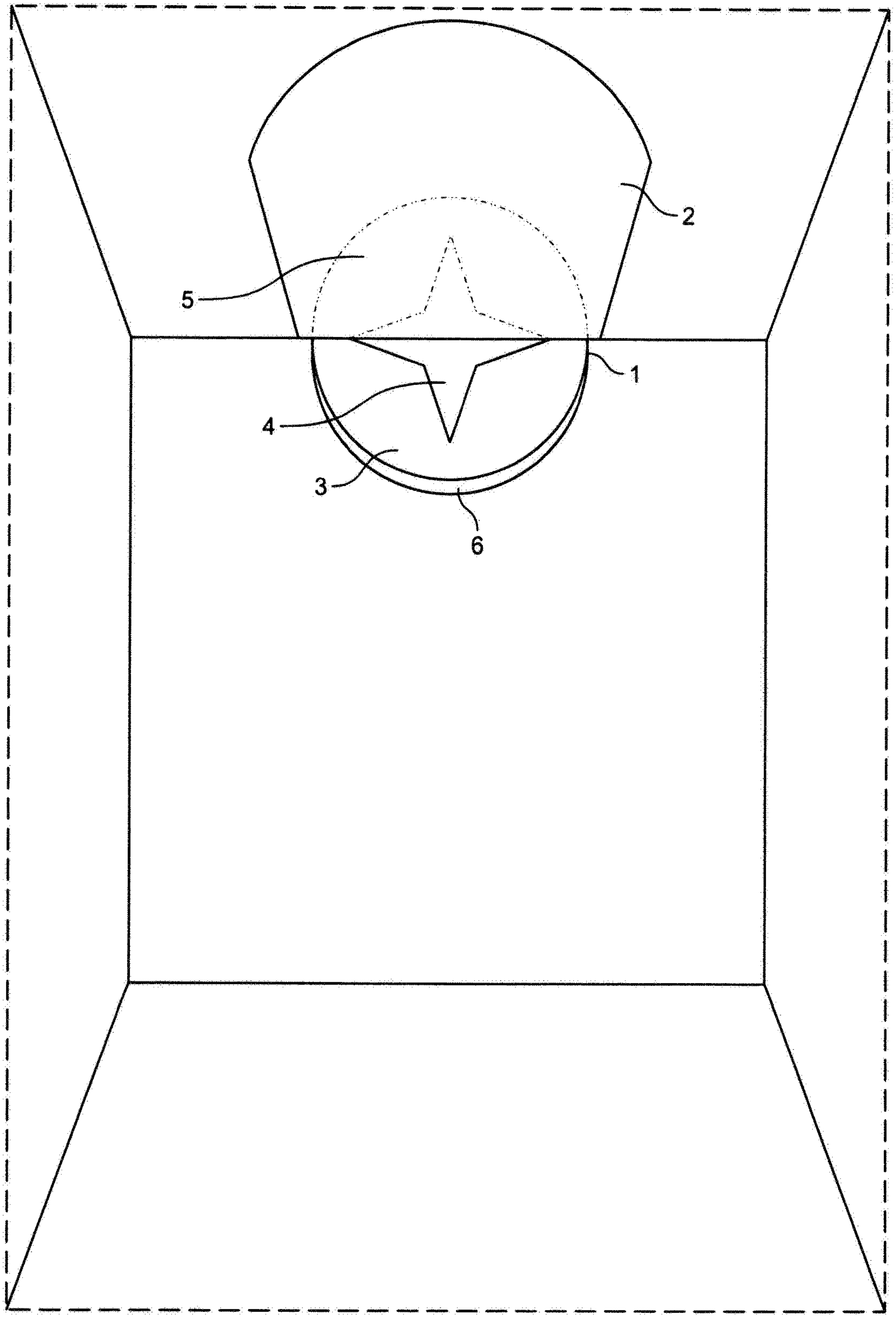

However, the effect of the embodiment may be especially pleasing to some consumers if the shape of the light-emitting panel 1 forms one half of a commonly recognizable shape or object, for example, half of a circle, or half of a star, as is depicted in FIG. 1. The light-emitting panel 1 and its reflection on the reflective panel 2 would then be seen together as the commonly recognizable shape or object in its full form, for example, a full circle or a complete star.

The light-emitting panel 1 may or may not have a distinct border. However, the absence of a visually distinct border along its straight edge contiguously flush to the ceiling-mounted reflective panel 2 would maximize the effect of a commonly recognizable shape or object in its full form, as described above.

The face 3 of the light-emitting panel 1 may be flat, curved, textured, sculptured (as in bas relief), etc. or a mixture of such. It may be opaque and reflects light from an external source. Or, it may have an intrinsic light source, if the light-emitting panel 1 is made of a material that is incandescent, luminescent, iridescent, opalescent, etc. Or, it may be translucent such as frosted glass, plexiglass, onyx, quartz, engineered stones, etc. with backlighting.

The pattern 4 on the face 3 of the light-emitting panel 1 may vary from none to elaborate, static or kinetic, changeable or non-changeable, etc. The pattern 4 may be executed as stained glass, silhouette, fretwork, illuminated artwork, projected image, etc.

However, the effect of the embodiment would be especially attractive to some consumers if the pattern 4 on the light-emitting panel 1 and its own reflection on the reflective panel 2 together constitute one commonly recognizable shape or object. This effect is most easily achieved if the whole pattern consists of two halves which are mirror images, for example, sunburst, diamond, mandala, sunflower, etc.

The material for the reflective panel 2 with a smooth surface, which is mounted on the ceiling, may vary, for example, mirror, aluminum, brass, foil, polished steel, metallic silver, metallic gold, shell, etc. The aesthetic effect may vary with the material and it's reflective capacity.

The surface of the reflective panel 2 may vary, for example, flat, curved, clear, tinted or patterned, etc. But the aesthetic effect of the embodiment might be optimized for some consumers if the surface of the reflective panel 2 is flat and clear, without tint or pattern.

The size and shape of the reflective panel 2 may vary. But, for an optimally pleasing proportion from the point of view of some consumers, it would be smaller substantially than the whole ceiling. Yet it would be big enough to allow the light-emitting panel 1 and its reflection 5 on the reflective panel 2 to be seen fully together from a substantial portion of the room. Also, the reflective panel 2 would leave most of the ceiling uncovered to maximize the illusion that the image of the light-emitting panel 1 and its reflection 5 on the reflective panel 2, when seen together, appear to pierce the more expansive ceiling. Also, the reflective panel 2 would have one straight edge, that is placed flush to the wall, where the wall meets the ceiling.

The angle between the wall and the ceiling on which the reflective panel 2 is mounted may vary, depending upon whether the ceiling is horizontal or slanted, and whether the wall is vertical or slanted. However, the embodiment might be especially pleasing for some consumers if the wall is vertical and the ceiling is horizontal, so that the ceiling is perpendicular to the wall, as is the case in most rooms. This would maximize the perception of a familiar or symmetrical object or shape formed by the light-emitting panel 1 and its reflection 5 on the reflective panel 2 seen together. Likewise, this would maximize the same effect produced by the pattern 4, if any, on the face 3 of the light-emitting panel 1 and its own reflection, if any, on the reflective panel 2 seen together.

While some consumers may prefer certain embodiments, others may appreciate alternative ones. The extensive set of possible variations exemplified above highlights the breadth of appeal of the embodiments to multiple tastes and inclinations. Indeed, this versatility in execution is another advantage to reckon with.

The light-emitting panel 1 may be built as is by itself, or may be housed in an enclosure made of a variable material such as wood, metal, etc.

The light-emitting panel 1 and the reflective panel 2 may be built integrally, that is, attached to each other with hinges or similar devices. Or, they may be produced separately as components to be assembled by the consumer. If the face 3 of the light-emitting panel 1 is made of a translucent material, the back lighting may be provided with a plug-in cord or incorp-orated with the internal electrical wiring behind the panel's face 3.

One embodiment, which is readily marketable, has the light-emitting panel 1 attached to the reflective panel 2 with hinges along the straight edges of the panels. The whole integrated product is boxed and sold. The consumer would simply mount the light-emitting panel 1 to the wall and the reflective panel 2 to the adjacent ceiling, where the wall meets the ceiling.

CONCLUSION

This set of embodiments and variations presents a way of enhancing perceived vertical space in a room with economic, aesthetic and psycho-social advantages. While the above description contains many specifics, they should not be construed as limitations on the scope. Rather, they should be considered as examples of multiple possible embodiments thereof. The scope should be determined by the claim and its legal equivalents and not be limited by the specific examples given.

I claim:

1. An article of manufacture installed in a room that creates the illusion of an enhanced perceived vertical space in the room, wherein the room has at least one wall and a ceiling, the article of manufacture comprising:

a wall-mounted light-emitting panel having a light source; wherein the light-emitting panel has a flat surface mounted flush to the wall of the room and an opposite disposed light emitting face;

a reflective panel having a mirror surface, wherein the reflective panel is mounted to the ceiling, the reflective panel having a straight edge that is flush to the wall at a point where the wall meets the ceiling;

wherein the wall-mounted panel is contiguously flush with the reflective panel at the point where the wall meets the ceiling;

wherein the light-emitting face comprises one half of a complete pattern, shape or object formed on the light-emitting face wherein the upper border of the pattern, symbol or object is contiguously flush with the ceiling at the point where the wall meets the ceiling;

wherein the pattern, symbol or object reflected by the light reflecting panel from the light-emitting panel is viewable in full form creating the illusion of enhanced perceived vertical space in the room.

* * * * *